Sept. 14, 1948.  L. P. McCABE  2,449,082
METHOD OF PREVENTING DISTORTION
IN BUTT WELDED PLATES
Filed April 5, 1946

INVENTOR.
LOUIS P. McCABE
BY
ATTORNEY

Patented Sept. 14, 1948

2,449,082

UNITED STATES PATENT OFFICE 2,449,082

METHOD OF PREVENTING DISTORTION IN BUTT-WELDED PLATES

Louis P. McCabe, Hollis, N. Y.

Application April 5, 1946, Serial No. 659,740

4 Claims. (Cl. 113—112)

(Granted under the act of March 3, 1883, as amended April 30, 1928; 370 O. G. 757)

This invention relates to a method for welding and more particularly to a method for preventing the distortion of welded plates at the welded area.

A particularly objectionable feature of multiple-pass welding of angled joints is the distortion that takes place at the welded area. When two relatively large and thick plates such as may be used in the construction of decks of ships, bridges, driveways, etc., are to be joined, the most common method of joining the plates is to make single groove welds by multiple passes. This method comprises making a thickness of weld near the root or base of the two plates, then when this first layer of weld has cooled, making another "pass" or weld atop of the initial weld.

As the weld is built up in this manner, the passes or layers of weld contract, tending to compress the top opposing faces of the thick plates towards each other. After each pass has been completed for a particular weld, the compression becomes greater, so that the buckling or distortion that occurs is beyond a tolerable range, resulting in deviations as high as 15° from a horizontal plane.

To compensate for this root shrinkage and consequent distortion of the upper faces of the plates being welded, strongbacks were used to predistort the plates in a direction opposite to their normal distortion tendency during multiple-pass welding with the hope that the contracting force of the weld would return the predistorted plates to a position wherein the top faces of the welded plates would be in a horizontal plane. More often than not, it was extremely difficult to gauge the amount of predistortion to apply to the plates that were to be welded. Moreover, some types of joints preclude counter distortion because of backing or supporting structure contiguous with the plates.

The more feasible method relies on the use of wedges to counteract the compressive forces of multiple-pass welds. This invention treats of the use of wedges, but in a novel manner, so as to eliminate the aforementioned undesirable distortion. Hence, the principal object of this invention is to provide a novel method for preventing distortion of welded plates during the welding process.

Figure 1:
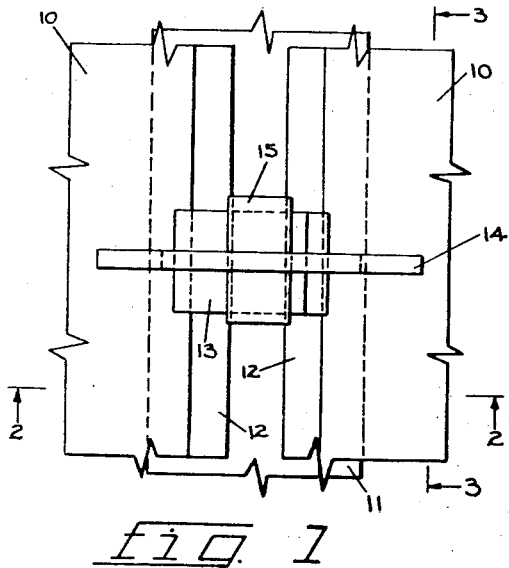
Figure 2:
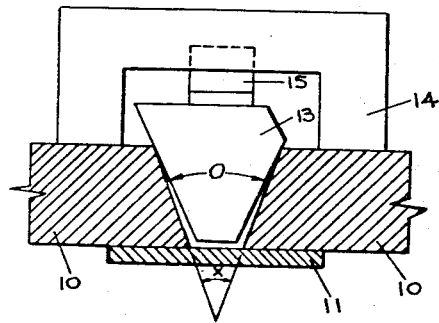
Figure 3:
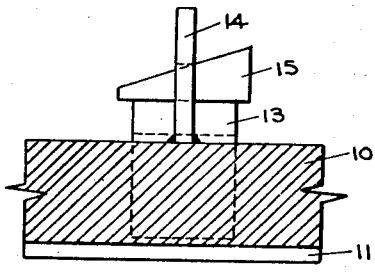

Further objects and advantages of this invention, as well as construction, arrangement and operation thereunder, will be apparent from the following description and claims in connection with the accompanying drawing, in which, Figure 1 is a plan view of apparatus employed to perform the method that constitutes the present invention, Figure 2 is a view taken along the line 2—2 of Figure 1, and Figure 3 is a view taken along the line 3—3 of Figure 1.

Figure 1 shows a pair of plates 10 that are spaced apart and resting on a plate 11. Bevels 12 are cut into the plates 10 and subtend an angle X as shown in Figure 2. This angle varies with each weld and usually lies between 15° and 45°. It was customary, prior to the method to be described herein, to place a wedge between the plates 10 so that the walls of the wedge were flush with the walls of the bevels 12. When the space S was filled with a suitable welding compound, the compression forces against the wedge walls were so great that the wedge had to be burned out of its seat between the plates 10 or otherwise destroyed in its removal from the space S.

The novel method suggested in the present application provides for a wedge whose subtended angle O is three to five degrees greater than angle X. In inserting such a wedge 13 between the plates 10, the compression forces of the plates 10 are applied to the wedge 13 along a line on each side of the wedge 13, rather than along the broad surfaces of the wedge 13, as would occur when the latter is cut an angle such that angle O equals angle X.

The angle bar 14 is welded to both plates 10 to form an overhead bridge over the wedge 13 so that another wedge 15 can be inserted between saddle of bar 14 and the butt of wedge 13, thus preventing the wedge 13 from springing out of its position between the plates 10. After the weld on both sides of the wedge 13 has been completed, the wedge 15 is knocked out, the angle bar 14 is fused off or otherwise removed from the plates 10, and the wedge 13 is pried and/or knocked out of its position, the wedge 13 being available for use for another welding operation on beveled plates such as plates 10.

While it is known that the use of mechanical spacers to restrain compressive forces is old, the use of wedges whose subtended angle is less by a predetermined amount than the angle subtended by the facing bevels of plates that are to be welded by the multiple-pass method is deemed novel and results in a more expeditious welding operation, a distortion-free weld, and also permits of the preservation of the wedge after the completion of the welding operation.

It is understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A method for preventing distortion of plates during the welding thereof comprising the steps of bevelling the facing surfaces to be welded so that said surfaces subtend a predetermined angle, and prior to the welding process, interposing a wedge against said faces, said wedge subtending an angle greater than the angle subtended by the bevelled surfaces.

2. A method for preventing distortion of plates during the welding thereof comprising the steps of bevelling the facing surfaces to be welded so that said surfaces subtend a predetermined angle, and prior to the welding process, interposing against said faces a wedge whose subtended angle is greater than the angle subtended by the bevelled surfaces, and applying a constant force against the butt of the wedge during the welding process.

3. A method for preventing distortion of plates during the welding thereof comprising the steps of bevelling the facing surfaces to be welded so that said surfaces subtend an angle between 15° and 45°, and prior to the welding process, interposing against said opposing bevelled faces a wedge whose subtended angle is greater by 3° to 5° than the angle subtended by the bevelled surfaces, and applying a constant force against the butt of the wedge during the welding process.

4. A method for preventing distortion of plates during the welding thereof comprising the steps of bevelling the facing surfaces to be welded so that said surfaces subtend an angle between 15° and 45°, and prior to the welding process, interposing against said opposing bevelled faces a wedge whose subtended angle is greater by 3° to 5° than the angle subtended by the bevelled faces so that the interposed wedge abuts substantially along a line of each bevelled surface rather than over its entire bevelled surface, and applying a constant force against the butt of the wedge during the welding process.

LOUIS P. McCABE.

REFERENCES CITED

The following references are of record in the file of this patent:

UNITED STATES PATENTS

| Number | Name | Date |
|---|---|---|
| 2,317,734 | Cook | Apr. 27, 1943 |
| 2,397,308 | Barnes | Mar. 26, 1946 |